United States Patent [19]

Metcalf et al.

[11] Patent Number: 4,867,295
[45] Date of Patent: Sep. 19, 1989

[54] SHOCK ABSORBING OVERTRAVEL STOP

[75] Inventors: Jeffrey D. Metcalf; Brent A. Klopfenstein, both of Rockford, Ill.

[73] Assignee: Sundstrand Corporation, Rockford, Ill.

[21] Appl. No.: 147,935

[22] Filed: Jan. 25, 1988

[51] Int. Cl.$^4$ .................... F16D 65/14; F16D 71/00
[52] U.S. Cl. ................................ 192/141; 74/89.15; 192/143
[58] Field of Search ............... 192/141, 143; 74/89.15

[56] References Cited

U.S. PATENT DOCUMENTS

| | | | |
|---|---|---|---|
| 2,868,030 | 1/1959 | Forwald | 192/143 X |
| 3,221,118 | 11/1965 | Hoover | 192/141 X |
| 3,326,054 | 6/1967 | Canick et al. | 192/141 X |
| 4,064,981 | 12/1977 | House et al. | 192/141 |
| 4,318,304 | 3/1982 | Lang | 74/89.15 |
| 4,641,737 | 2/1987 | Gillingham et al. | 192/141 |
| 4,721,196 | 1/1988 | Layer et al. | 192/141 |

Primary Examiner—Rodney H. Bonck
Attorney, Agent, or Firm—Wood, Dalton, Phillips, Mason & Rowe

[57] ABSTRACT

A shock absorbing overtravel stop apparatus which includes a rotatable drive shaft 10, a screw shaft 15 driven by the drive shaft 10, and a nonrotatable travelling nut 30 threaded on and moveable axially along the screw shaft 15. At one end 28 of the screw shaft 15, the apparatus is provided with a rotating stop 38 and a stationery stop 40. At the other end 20 of the screw shaft 15, there is provided a bearing housing 21, journalling the screw shaft 15 for rotation and mounting the screw shaft for axial movement along the axis. The travelling nut 30 is moveable in one direction to engage the stops 38, 40 whereupon the rotary motion of the screw shaft 15 is terminated. The travelling nut 30 is also moveable in the other direction into contact with the bearing housing 21 to exert an axial force upon the screw shaft 15 such that the screw shaft 15 moves axially to engage the stops 38, 40 whereupon the rotary motion of the screw shaft 15 is terminated. The screw shaft 15 of the present invention acts as a torsion shock absorber upon the termination of the rotary motion of the screw shaft 15 by the stops 38, 40.

15 Claims, 1 Drawing Sheet

SHOCK ABSORBING OVERTRAVEL STOP

BACKGROUND OF THE INVENTION

1. Field of the Invention

The invention generally relates to shock absorbing overtravel stops for aircraft actuators, and more specifically, to the type of shock absorbing overtravel stop wherein a travelling nut is moveable along a screw shaft.

2. Background of the Invention

It is known that in the actuation of the control surfaces of aircraft, some type of overtravel stop is required to prevent damage which may result to the aircraft structure or the flight control surfaces when the normal operating range of the control surface is exceeded.

The use of an overtravel stop using a travelling nut on a screw shaft to limit the number of revolutions which a shaft may make in either direction is well known. Such stop mechanisms usually require some type of energy absorber to cushion the drive train from the high torque spikes which result when the stop is suddenly engaged by a nut. This is often accomplished through the use of a torsional shock absorber or a long torsion rod as exemplified in U.S. Pat. No. 4,064,981 issued Dec. 27, 1977 to House et al.

House discloses a limit stop apparatus wherein a driven shaft rotates a predetermined number of revolutions in either direction whereupon a travelling nut assembly contacts a shock absorbing stop, made up of energy absorbing rotating and stationary discs, at either end of the screw shaft to terminate shaft rotation by frictionally jamming threads between the nut assembly and the driven shaft. As the shaft is driven at a location remote from the nut when the latter is against either stop, the length of the shaft between the nut and the drive torsionally absorbs the shock. A problem with this prior construction is the increased weight which is a necessary consequence of the use of a shock absorbing stop at each end of the shaft.

Further, the use of a separate torsion rod is not advantageous since the combined length of the torsion rod and stop screw can become prohibitively long.

The present invention is directed toward overcoming one or more of the problems as set forth above.

SUMMARY OF THE INVENTION

It is the principal object of the invention to provide a new and improved shock absorbing overtravel stop apparatus. More specifically, it is an object of the invention to provide an overtravel stop apparatus wherein a travelling nut operates upon a single shock absorbing stop and wherein the screw shaft acts as a torsion shock absorber.

An exemplary embodiment of the invention achieves the foregoing object in an overtravel stop apparatus including a rotatable drive shaft with opposite ends which is adapted to drive a load at one end and is driven at the other end. Additionally, means are provided for interconnecting the drive shaft and a rotatable screw shaft having an axis and opposite ends. A nonrotatable travelling nut is threaded on and moveable axially along the screw shaft.

Stop means are located at one end of the screw shaft for terminating the rotary motion of the screw shaft once the travelling nut has travelled to either end of the screw shaft. The screw shaft thus acts as a torsion shock absorbing means upon the termination of the rotary motion of the screw shaft by the stop means.

In the preferred embodiment, the stop means comprises a rotating stop and a stationary stop. The rotating stop is splined to the screw shaft and includes axially engageable means comprising at least one dog. The stationary stop, also, includes at least one dog which is axially engageable with the dog(s) on the rotating stop.

In one embodiment, a spring provides a separating force between the rotating stop and the stationary stop to normally disengage the dogs.

In the preferred embodiment, there is included a bearing housing at the end of the screw shaft opposite the stops, which journals the screw shaft about its axis and is mounted on the screw shaft for axial movement along the same axis.

In a highly preferred embodiment, the travelling nut is moveable in one direction into contact with the rotating stop thereby causing the dog(s) on the rotating stop to engage with the dog(s) on the stationary stop whereupon the rotary motion of the screw shaft is terminated. The travelling nut is also moveable in the other direction into contact with the bearing housing to exert an axial force on the screw shaft such that the screw shaft moves axially to engage the dog(s) on the rotating stop with the dog(s) on the stationary stop whereupon the rotary motion of the screw shaft is terminated.

In a preferred embodiment, the travelling nut is made nonrotatable by means of a tab which extends radially from the travelling nut and which is engageable with a groove which extends axially the length of the screw shaft.

Other objects and advantages will become apparent from the following specification taken in connection with the accompanying drawings.

DESCRIPTION OF THE PREFERRED EMBODIMENTS

Figure 1:
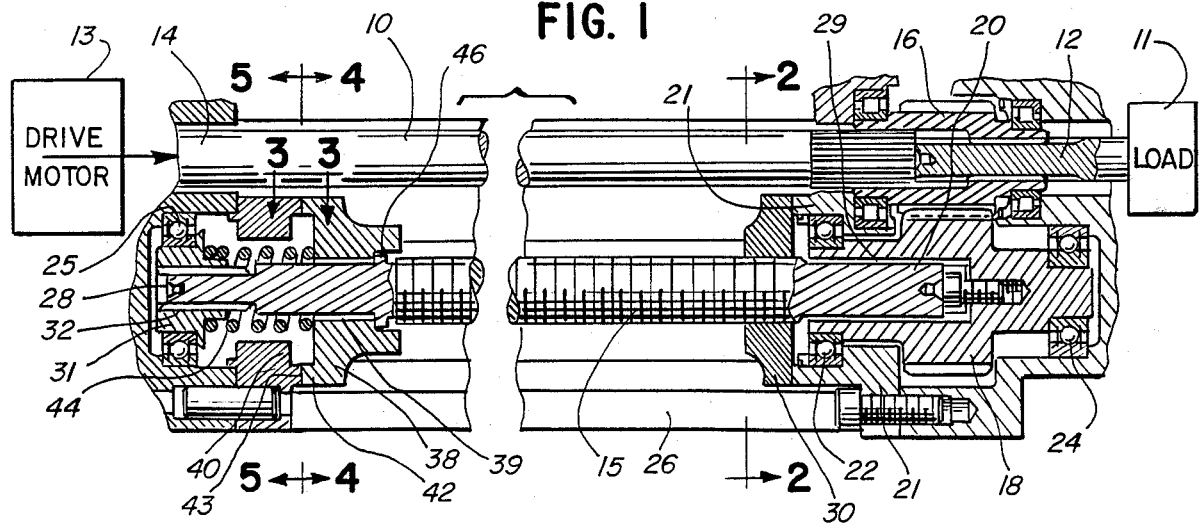
FIG. 1 is a sectional view of an overtravel stop apparatus exemplary of the present invention.

An exemplary embodiment of the shock absorbing overtravel stop apparatus according to the invention is illustrated in FIG. 1 and is seen to include a rotatable drive shaft 10 adapted to drive a load 11 at one end 12 and driven by high inertia motor 13 at the other end 14. A screw shaft 15 is drivingly interconnected with the driveshaft 10 by any suitable means such as interengaging gears 16 and 18 coupled respectively to the shafts 10 and 15.

Figure 2:
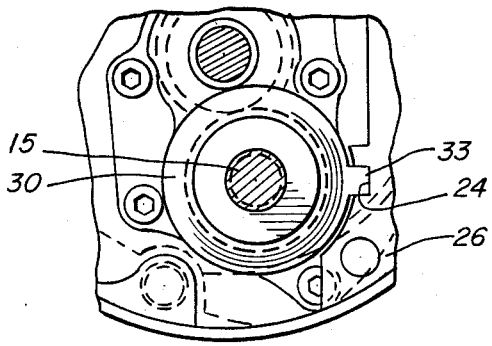
FIG. 2 is a cross-sectional view taken generally along line 2—2 of FIG. 1.

At the right most end 20 of the screw shaft 15, and about the drive gear 18, is a bearing housing 21. Bearings 22 and 24 supported by the housing 21 and bearings 25 supported by a screw shaft housing 26 at the left end 28 of the screw shaft 15 journal the screw shaft 15 for rotation about its axis. The screw shaft 15 is secured to the drive gear 18 by means of a spline 29 thereby mounting the screw shaft 15 for axial movement along its axis. The bearings 25 journal the screw shaft 15 for rotation about its axis by means of an end cap 31 which, by means of a spline 32, mounts the screw shaft 15 for axial movement along its axis. Also shown in FIG. 1 is a travelling nut 30 threaded on and moveable axially along the screw shaft 15. As shown in FIG. 2, the travelling nut 30 is made nonrotatable by means of a tab 33 which extends radially from the travelling nut 30 into a groove 34 located within the screw shaft housing 26, which extends the length of the screw shaft 15.

Figure 4:
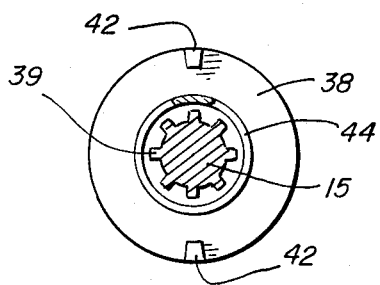
FIG. 4 is a cross-sectional view taken generally along the line 4—4 of FIG. 1.
Figure 5:
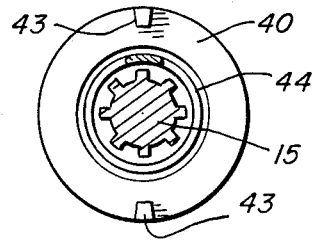
FIG. 5 is a cross-sectional view taken generally along the line 5—5 of FIG. 1.

Referring back to FIG. 1, and specifically to the left most end 28 of the overtravel stop apparatus, there is shown a rotating stop 38, mounted for rotation with and axial movement on the screw shaft 15 by means of a spline 39 (FIGS. 1 and 4). Also shown is a stationary stop 40 mounted and fixed to the screw shaft housing 26. Both the rotating stop 38 and the stationary stop 40 include axially engageable means in the form of respective dogs 42 and 43. As seen in FIGS. 4 and 5, there are two each of the dogs 42 and 43 at diametrically opposite locations on the respective stops 38 and 40. A spring 44 is interposed between the end cap 31 and the rotating stop 38 to provide a rightward axial separating force between the rotating stop 38 and the stationary stop 40 to normally disengage the dogs 42 and 43 thereof. A collar 46 on the shaft 15 limits rightward movement of the rotating stop 38 as a result of the bias of the spring 44.

Figure 3A:
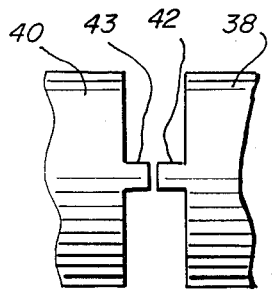
FIGS. 3a and 3b are enlarged, cross-sectional views, taken generally along the line 3—3, respectively illustrating a disengaged and engaged relationship between a rotating stop and a stationary stop used in the embodiment illustrated in FIG. 1.
Figure 3B:
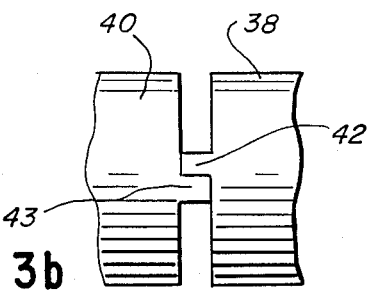

The normal disengaged relationship between the rotating stop 38 and the stationary stop 40 is shown in FIG. 3a, while FIG. 3b shows the dogs 42 and 43, respectively, on the rotating stop 38 and the stationary stop 40 in their engaged relationship.

FIG. 5 illustrates the concentric relationship between the screw shaft 15 and the stationary stop 40 with the latter surrounding, but not contacting the former.

The method of operation will now be described in relation to the movement of the travelling nut 30 to both ends of the screw shaft 15. When the drive shaft 10 rotates in one direction and drives the screw shaft 15, the travelling nut 30 will be caused to move from right to left in FIG. 1 on the screw shaft 15. Eventually, the nut 30 will move into contact with the rotating stop 38 to drive the rotating stop 38 to the left as viewed in FIG. 1. When the travelling nut 30 pushes the rotating stop 38 against the stationary stop 40, the dogs 42 and 43 will engage and the rotating stop 38 will be prevented from rotating further by the stationary stop 40. Since the rotating stop 38 is connected to the screw shaft 15 in splined relation, as shown in FIG. 4, it follows that the rotation of the screw shaft 15 will be terminated. When this occurs, the left most end 28 of the screw shaft 15 is prevented from rotating but the right most or driven end 20 of the screw shaft 15 will twist slightly relative to the left most end 28 because of the inertia of the system. Under these conditions, the screw shaft 15 acts as a torsion spring and performs the function of a shock absorber. At the same time, rotation of the drive shaft 10 is halted with torsional cushioning.

If the drive shaft 10 is rotating in the opposite direction to that described above, the travelling nut 30 will be caused to move from left to right in FIG. 1. Eventually, the travelling nut 30 will strike the bearing housing 21 and the axial movement of the travelling nut 30 will be stopped. The shaft 15 will continue to rotate, however, and a leftward axial force will be exerted against the screw shaft 15 by the stopped nut 30 causing the screw shaft 15 to move axially toward the left in FIG. 1 as a reaction to the engagement between the travelling nut 30 and the bearing housing 21. When the screw shaft 15 moves towards the left in FIG. 1, the collar 46 on the screw shaft 15 will drive the rotating stop 38 to the left into engagement with the stationary stop 40. When this occurs, the left most end 28 of the screw shaft 15 is prevented from rotating but the right most driven end 20 of the screw shaft 15 will twist slightly relative to the end 28, again to torsionally absorb shock while halting rotation of the drive shaft 10.

It should be apparent that the rotating stop 38 is moved toward the left in FIG. 1 when the travelling nut 15 moves to its leftmost position against the rotating stop 38 and also when the travelling nut 15 moves to its right most position against the bearing housing 21. In either case, the rotating stop 38 is moved toward the left into contact with the stationary stop 40 and the screw shaft 15 is prevented from rotating at its left most end 28. Yet the right most end 20 of the shaft may nonetheless twist with respect to the left most end providing for torsional shock absorption.

Thus, the invention provides a bidirectional shock absorbing overtravel stop of minimal weight and size since stops are employed only at one shaft end and a separate torsion rod is not required.

We claim:

1. A shock absorbing overtravel stop apparatus for a rotating shaft, said apparatus comprising:
   a rotatable drive shaft having opposite ends and adapted to drive a load at one end and to be driven by a high inertia motor at the other end;
   a rotatable and axially moveable screw shaft having an axis and opposite ends;
   means drivingly interconnecting said drive shaft and said screw shaft;
   a non-rotatable travelling nut threaded on and moveable axially along said screw shaft; and
   stop means at one end of said screw shaft for terminating the rotary motion of said screw shaft upon said travelling nut travelling to either end of said screw shaft.

2. The shock absorbing overtravel stop apparatus of claim 1 wherein the stop means comprises a rotating stop and a stationary stop.

3. A shock absorbing overtravel stop apparatus for a rotating shaft, said apparatus comprising:
   a rotatable drive shaft having opposite ends and adapted to drive a load at one end and to be driven by a high inertia motor at the other end;
   a rotatable screw shaft having an axis and opposite ends;
   means drivingly interconnecting said drive shaft and said screw shaft;
   a non-rotatable travelling nut threaded on and moveable axially along said screw shaft;
   stop means comprising a rotating stop and a stationary stop at one end of said screw shaft for terminating the rotary motion of said screw shaft upon said travelling nut travelling to either end of said screw shaft, said rotating stop being splined to said screw shaft and including at least one dog.

4. The shock absorbing overtravel stop apparatus of claim 3, wherein said stationary stop includes at least one dog axially engageable with said dog(s) on said rotating stop.

5. The shock absorbing overtravel stop apparatus of claim 4, wherein a spring provides a separating force between said rotating stop and said stationary stop to normally disengage said dog(s).

6. The shock absorbing overtravel stop apparatus of claim 4 further including a bearing housing, at the opposite end of said screw shaft, journalling said screw shaft for rotation about said axis and mounting said screw shaft for axial movement along said axis, said travelling nut moveable in one direction into contact with said rotating stop causing said dog(s) on said rotating stop to engage said dog(s) on said stationary stop whereupon the rotary motion of said screw shaft is terminated, said travelling nut also moveable in the other direction into contact with said bearing housing to exert an axial force on said screw shaft such that said screw shaft moves axially to engage the dog(s) on said rotating stop with the dog(s) on said stationary stop whereupon upon the rotary motion of the screw shaft is terminated.

7. A shock absorbing overtravel stop apparatus for a rotating shaft, said apparatus comprising:
 a rotatable drive shaft having opposite ends and adapted to a drive a load at one end and to be driven by a high inertia motor at the other end;
 a rotatable screw shaft having an axis and opposite ends;
 means drivingly interconnecting said drive shaft and said screw shaft;
 a non-rotatable travelling nut threaded on and moveable axially along said screw shaft; and
 stop means at one end of said screw shaft for terminating the rotary motion of said screw shaft upon said travelling nut travelling to either end of said screw shaft, said screw shaft acting as a torsion shock absorbing means upon the termination of the rotary motion of said screw shaft by said stop means.

8. A shock absorbing overtravel stop apparatus, said apparatus comprising:
 a rotatable drive shaft having opposite ends and adapted to drive a load at one end and to be driven by a high inertia motor at the other end;
 a rotatable and axially moveable screw shaft having an axis and opposite ends;
 means drivingly interconnecting said drive shaft and said screw shaft;
 a non-rotatable travelling nut threaded on and moveable axially along said screw shaft;
 stop means at one end of said screw shaft for terminating the rotary motion of said screw shaft upon said travelling nut travelling to either end of said screw shaft;
 said stop means comprising a rotating stop and a stationary stop; and
 axially engageable means on said rotating stop and said stationary stop for terminating the rotation of said rotating stop.

9. The shock absorbing overtravel stop apparatus of claim 8, wherein said axially engageable means comprises at least one dog located on each of said rotating stop and said stationary stop.

10. The shock absorbing overtravel stop apparatus of claim 9, further including a bearing housing, at the opposite end of said screw shaft, said bearing housing journalling said screw shaft for rotation about said axis and mounting said screw shaft for axial movement along said axis.

11. The shock absorbing overtravel stop apparatus of claim 10 wherein said travelling nut is moveable in one direction into contact with said rotating stop causing said dog(s) on said rotating stop to engage said dog(s) on said stationary stop whereupon the rotary motion of said screw shaft is terminated, said travelling nut also moveable in the other direction into contact with said bearing housing to exert an axial force on said screw shaft such that said screw shaft moves axially to engage the dog(s) on said rotating stop with the dog(s) on said stationary stop whereupon the rotary motion of said screw shaft is terminated.

12. The shock absorbing overtravel stop apparatus of claim 8, wherein said rotating stop is splined to said screw shaft.

13. The shock absorbing overtravel stop apparatus of claim 8, wherein said screw shaft acts as shock absorbing means upon the termination of the rotary motion of said screw shaft by said stop means.

14. A shock absorbing overtravel stop apparatus, said apparatus comprising:
 a rotatable drive shaft having opposite ends and adapted to drive a load at one end and to be driven by a high inertia motor at the other end;
 a rotatable screw shaft having an axis and opposite ends;
 means including stop drive gears interconnecting said drive shaft and said screw shaft;
 a bearing housing at one end of said screw shaft, said bearing housing journalling said screw shaft for rotation about said axis and mounting said screw shaft for axial movement along said axis;
 a rotating stop at the opposite end of said screw shaft and connected to said screw shaft in splined relation, said rotating stop including at least one dog;
 a stationary stop at said screw shaft opposite end, said stationary stop including at least one dog axially engageable with said dog(s) on said rotating stop to prevent further rotation thereof;
 spring means providing a separating force between said rotating stop and said stationary stop to normally disengage said dog(s); and
 a non-rotatable travelling nut threaded on and moveable axially along said screw shaft;
 said travelling nut moveable in one direction into contact with said rotating stop causing said dog(s) on said rotating stop to engage said dog(s) on said stationary stop whereupon the rotary motion of said screw shaft is terminated, said travelling nut also moveable in the other direction into contact with said bearing housing to exert an axial force on said screw shaft such that said screw shaft moves axially to engage the dog(s) on said rotating stop with the dog(s) on said stationary stop whereupon the rotary motion of said screw shaft is terminated;
 said screw shaft acting as torsion shock absorbing means upon the termination of the rotary motion of said screw shaft by said stop means.

15. The shock absorbing overtravel stop apparatus of claim 14, wherein the travelling nut is made non-rotatable by means of a tab extending radially from said travelling nut, said tab engageable with a groove extending axially the length of said screw shaft.

* * * * *